US009194139B2

(12) United States Patent
Yi et al.

(10) Patent No.: US 9,194,139 B2
(45) Date of Patent: Nov. 24, 2015

(54) METHOD AND SYSTEM FOR CONTROLLING ENGINE SPEED AND BOOM-TYPE ENGINEERING MACHINE

(71) Applicants: HUNAN SANY INTELLIGENT CONTROL EQUIPMENT CO., LTD, Changsha, Hunan (CN); SANY HEAVY INDUSTRY CO., LTD, Changsha, Hunan (CN)

(72) Inventors: Xiaogang Yi, Changsha (CN); Dongliang Pu, Changsha (CN); Qiang Liu, Changsha (CN)

(73) Assignees: HUNAN SANY INTELLIGENT CONTROL EQUIPMENT CO., LTD, Changsha, Hunan (CN); SANY HEAVY INDUSTRY CO., LTD, Changsha, Hunan (CN)

( * ) Notice: Subject to any disclaimer, the term of this patent is extended or adjusted under 35 U.S.C. 154(b) by 67 days.

(21) Appl. No.: 14/141,012

(22) Filed: Dec. 26, 2013

(65) Prior Publication Data

US 2014/0129096 A1 May 8, 2014

Related U.S. Application Data

(63) Continuation of application No. PCT/CN2012/074034, filed on Apr. 14, 2012.

(30) Foreign Application Priority Data

Jun. 28, 2011 (CN) .......................... 2011 1 0177191

(51) Int. Cl.

| | |
|---|---|
| ***G06F 7/70*** | (2006.01) |
| ***E04G 21/04*** | (2006.01) |
| ***B66C 13/18*** | (2006.01) |

(Continued)

(52) U.S. Cl.

CPC ................ *E04G 21/04* (2013.01); *B66C 13/18* (2013.01); *F02D 31/001* (2013.01); *F02D 41/021* (2013.01)

(58) Field of Classification Search

None

See application file for complete search history.

(56) References Cited

U.S. PATENT DOCUMENTS 5,701,691 A * 12/1997 Watanabe et al. ............... 37/348
2008/0162005 A1* 7/2008 Tang et al. ...................... 701/50

(Continued)

FOREIGN PATENT DOCUMENTS

CN 101076636 A 11/2007
CN 102392747 A 3/2010

(Continued)

OTHER PUBLICATIONS

State Intellectual Property Office of the People's Republic of China, "Internatinal Search Report", China, Jul. 19, 2012.

*Primary Examiner* — Calvin Cheung

(74) *Attorney, Agent, or Firm* — Tim Tingkang Xia, Esq.; Locke Lord LLP

(57) ABSTRACT

The disclosure relates generally to the field of boom-type engineering machinery, which discloses particularly an engine speed control method used to control an output speed of an engine of a boom-type engineering machine during a boom action including: detecting a load pressure of a hydraulic system and a moving speed of a boom; determining a target speed of the engine according to the load pressure and the moving speed of the boom, by a central control unit; and sending, by the central control unit, the target speed of the engine to an engine control unit, and performing, by the engine control unit, a speed closed-loop adjustment according to a current speed value fed back by the engine, so that a current speed of the engine is consistent with the target speed of the engine. Further aspects are an engine speed control system and a boom-type engineering machine equipped therewith.

7 Claims, 3 Drawing Sheets

(51) Int. Cl.
*F02D 41/02* (2006.01)
*F02D 31/00* (2006.01)

(56) References Cited

U.S. PATENT DOCUMENTS

2009/0211435 A1* 8/2009 Yi et al. .......................... 91/361
2010/0262353 A1* 10/2010 Hyodo et al. ................. 701/102

FOREIGN PATENT DOCUMENTS

CN 101835968 A 9/2010
JP 0350034 A 3/1991

* cited by examiner

METHOD AND SYSTEM FOR CONTROLLING ENGINE SPEED AND BOOM-TYPE ENGINEERING MACHINE

CROSS-REFERENCE TO RELATED APPLICATIONS

This application is a continuation application of International Patent Application No. PCT/CN2012/074034, filed Apr. 14, 2012, entitled "ENGINE SPEED CONTROL METHOD, CONTROL SYSTEM AND JIB-TYPE ENGINEERING MACHINE", by Xiaogang Yi et al., which itself claims the priority to Chinese Patent Application No. 2011101771915.0, filed Jun. 28, 2011, entitled "ENGINE SPEED CONTROL METHOD, CONTROL SYSTEM AND JIB-TYPE ENGINEERING MACHINE", by Xiaogang Yi et al., the disclosures for which are hereby incorporated herein in their entireties by reference.

FIELD OF THE DISCLOSURE

The present disclosure relates generally to the field of boom-type engineering machinery, and more particularly to an engine speed control method utilized to control an output speed of an engine of a boom-type engineering machine during a boom action, an engine speed control system and a boom-type engineering machine with the engine speed control system.

BACKGROUND OF THE DISCLOSURE

A concrete pump vehicle is a common boom-type engineering machine. A concrete pump vehicle is widely used in modern construction engineering such as developing urban, transportation, and national defense facilities. The economic efficiency of a concrete pump vehicle directly decides the construction cost and the severity of environmental pollution. As nowadays the ideas of energy conservation and environmental protection are widely and increasingly acknowledged, highly-efficient, energy-conserving, and environmentally-friendly concrete pump vehicle products become more and more favored.

In a concrete pump vehicle, a power system transfers the power of an engine to a hydraulic pump unit through a power transfer case, a portion of the hydraulic oil discharged from a hydraulic pump drives a concrete pump to work, and another portion of the hydraulic oil is used to drive boom sections of a boom structure to perform an action.

Conventionally, when a boom of a concrete pump vehicle performs an action, a control mode for an engine power system makes an engine to work at a rated speed. Such a control mode is capable of providing sufficient power, at the same time the maximum flow demand during boom operations is met, power matching and flow matching are not required, and its control method is simple and highly reliable.

In the control mode for the engine power system, the engine is set at a rated speed, the power reservation is pretty sufficient, and the equipment works at an area with a high oil consumption rather than running in an economical work area, which reduces the economic efficiency of its chassis power system.

In addition, the boom of a concrete pump vehicle is in a low-load working condition. When the engine works at a rated speed, the excessive power is consumed in the form of vibrations, impacts, and noises, which results in severe waste of energy sources in a long run.

Therefore, a heretofore unaddressed need exists in the art to address the aforementioned deficiencies and inadequacies.

SUMMARY OF THE DISCLOSURE

A first objective of the present disclosure is to provide an engine speed control method, for controlling an output speed of an engine of a boom-type engineering machine during a boom action, so that the engine always works at a highly efficient area of fuel utilization. A second objective of the present disclosure is to provide an engine speed control system. A third objective of the present disclosure is to provide a boom-type engineering machine with the engine speed control system.

To implement the first objective, the present disclosure provides an engine speed control method, so as to control an engine output speed of a boom-type engineering machine during a boom action, which includes the following steps:

Step A: A load pressure of a hydraulic system and a moving speed of a boom are detected.

Step B: A central control unit determines a target speed of the engine according to the load pressure and the moving speed of the boom.

Step C: The central control unit sends the target speed of the engine to an engine control unit, and the engine control unit performs speed closed-loop adjustment according to a current speed value fed back by an engine, so that a current speed of the engine is consistent with the target speed of the engine.

In one embodiment, Step B may include: the central control unit calculates an engine initial control speed matching the load pressure and the moving speed of the boom according to a power matching model and a flow matching model, and determines the target speed of the engine according to the engine initial control speed.

In one embodiment, the target speed of the engine is the engine initial control speed; or, the central control unit acquires an engine segment speed corresponding to the engine initial control speed, and the target speed of the engine is the engine segment speed.

In one embodiment, the load pressure is detected by a pressure sensor installed in a hydraulic system.

In one embodiment, the moving speed of the boom may be reflected by a push rod amplitude and a shift of a boom remote controller.

In one embodiment, the engine initial control speed, the load pressure, and the push rod amplitude may meet the relationship: $n=f(P, q, T_0, T_1, \ldots, T_n$, where n is the engine initial control speed, P is the load pressure, q is the hydraulic pump displacement, $T_0$ is the push rod amplitude corresponding to the rotating boom, $T_1$ is the push rod amplitude corresponding to the first boom section, and $T_n$ is the push rod amplitude corresponding to the $n^{th}$ boom section.

The engine speed control method according to one embodiment of the present disclosure includes the following steps: detecting a load pressure of a hydraulic system, and detecting a moving speed of a boom; determining, by a central control unit, a target speed of the engine according to the load pressure and the moving speed of the boom; sending, by the central control unit, the target speed of the engine to an engine control unit, and performing, by the engine control unit, closed-loop adjustment according to a current speed value fed back by an engine, so that a current speed of the engine is consistent with the target speed of the engine.

According to the engine speed control method, a load pressure signal of a hydraulic system and an action speed signal of a boom are collected; an optimal engine speed that meets a boom power flow demand and an engine output power demand is calculated; the optimal engine speed is set as the target speed of the engine; the target speed of the engine is input to an engine control unit; a current speed fed back by an engine in real time is sent to a central control unit; and the engine control unit implements PID closed-loop control according to the current speed fed back by the engine, so that the current speed of the engine becomes the set target speed of the engine.

Such an engine speed control method can implement energy supply on demand of a power system during a boom action, so that an engine always works at a highly efficient area of fuel utilization, without any excessive energy loss, and impacts, noises, and machine wear of the system are clearly reduced. Further, the engine speed control method can implement flow supply on demand of a hydraulic system during a boom action, and without any overflow loss. Moreover, the engine speed control method can implement real-time and automatic adjustment of an engine speed with the changes of the load pressure and boom operation during a boom action, so that the automation degree is high and the adaptability is high.

In one embodiment, the central control unit calculates an engine initial control speed matching a load pressure and a moving speed of a boom according to a power matching model and a flow matching model. The central control unit acquires an engine segment speed corresponding to the engine initial control speed, and the engine segment speed is the target speed of the engine.

According to the continuity and stability requirements of a boom action, the flow of hydraulic oil for controlling the boom action needs to be uniform and continuous. The engine initial control speed is a real-time optimal speed and is a quantity that changes in real time. To guarantee the continuity and stability of the boom action, an engine segment speed corresponding is set to the engine initial control speed that changes in real time. The engine segment speed is formed of a plurality of different and continuous speed segments of the speed. Each speed segment has a stable speed value, and the engine segment speed is used as the target speed of the engine, so as to guarantee the continuity of flow and the stability of engine output power during a boom action.

To implement the second objective, the present disclosure provides an engine speed control system, which includes a central control unit and an engine control unit. In operation, the central control unit acquires a load pressure of a hydraulic system and a moving speed of a boom and determines a target speed of the engine according to the load pressure and the boom speed. The central control unit sends the target speed of the engine to the engine control unit and the engine control unit performs speed closed-loop adjustment according to a current speed value fed back by an engine, so that a current speed of the engine is consistent with the target speed of the engine.

In one embodiment, a pressure sensor used to detect the load pressure of the hydraulic system is further included, and the pressure sensor is installed in the hydraulic system.

The engine speed control system according to one embodiment of the present disclosure includes a central control unit and an engine control unit. The central control unit acquires a load pressure of a hydraulic system and a moving speed of a boom and determines a target speed of the engine according to the load pressure and the boom speed. The central control unit sends the target speed of the engine to an engine control unit. The engine control unit performs speed closed-loop adjustment according to a current speed value fed back by an engine, so that a current speed of the engine is consistent with the target speed of the engine.

Such an engine speed control system can implement energy supply on demand of a power system during a boom action, so that an engine always works at a highly efficient area of fuel utilization, without any excessive energy loss, and impacts, noises, and machine wear of the system are clearly reduced. The engine speed control method can also implement flow supply on demand of a hydraulic system during a boom action, and without any overflow loss. Further, the engine speed control method can implement real-time and automatic adjustment of an engine speed with the changes of the load pressure and boom operation during a boom action, so that the automation degree is high and the adaptability is high.

To implement the third objective, the present disclosure provides a boom-type engineering machine. The boom-type engineering machine is configured with the engine speed control system. As the engine speed control system has the technical effect disclosed above, the boom-type engineering machine with the engine speed control system should also have the corresponding technical effect.

In one embodiment, the boom-type engineering machine is a concrete pump vehicle, a spreader, an all-terrain crane or a truck crane.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DESCRIPTION OF THE DISCLOSURE

Figure 1:
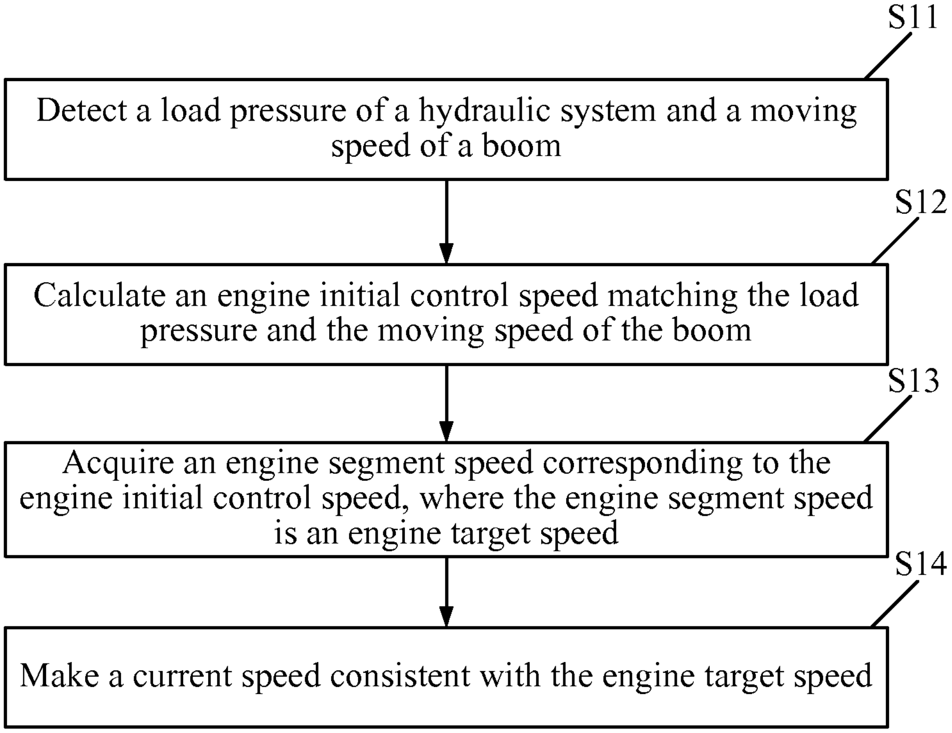
FIG. 1 is a flowchart of a method for controlling engine speed according to one embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "with" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as with a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings in FIGS. 1-3. In accordance with the purposes of this disclosure, as embodied and broadly described herein, this disclosure, in one aspect, relates to an engine speed control method utilized to control an output speed of an engine of a boom-type engineering machine during a boom action, an engine speed control system and a boom-type engineering machine with the engine speed control system.

Figure 2:
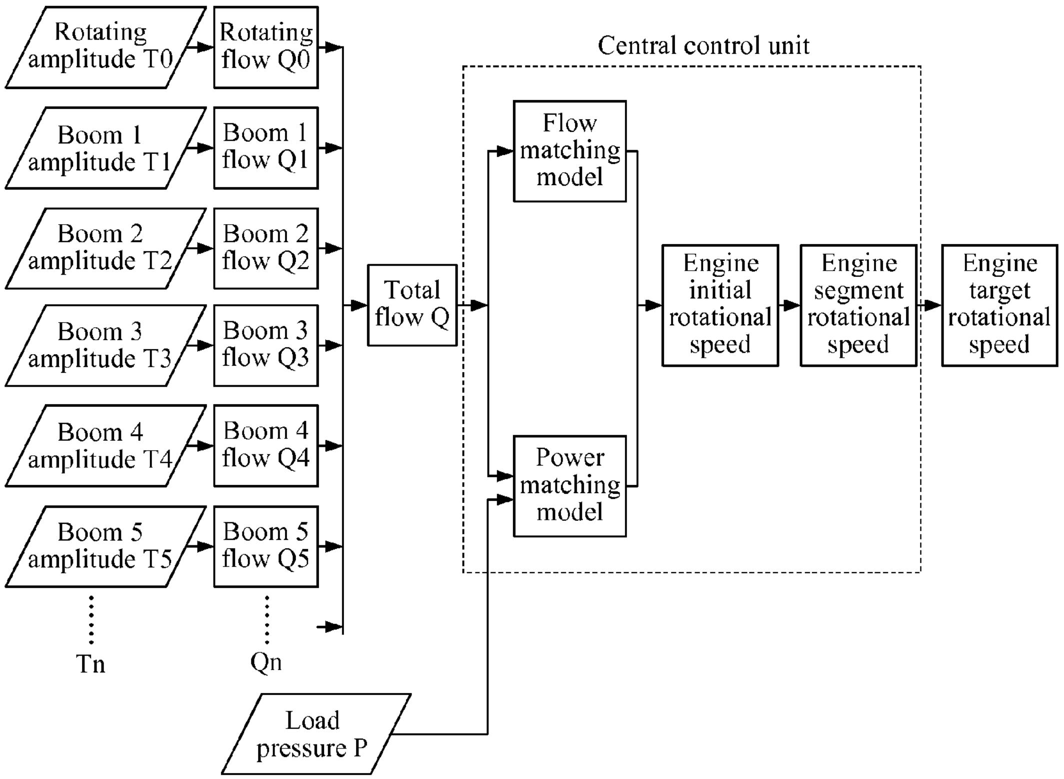
FIG. 2 is a schematic diagram of a control principle of the engine speed control method shown in FIG. 1.

Referring to FIG. 1 and FIG. 2, FIG. 1 shows a flowchart of a method for controlling engine speed so as to control an output speed of an engine of a boom-type engineering machine during a boom action according to one embodiment of the present disclosure, while FIG. 2 is a schematic diagram of a control principle of the engine speed control method shown in FIG. 1.

As showing in FIG. 1 and FIG. 2, the embodiment discloses an engine speed control method used to control an output speed of an engine of a boom-type engineering machine during a boom action. In this exemplary embodiment, the engine speed control method includes the following steps.

Step S11: A load pressure of a hydraulic system and a moving speed of a boom are detected.

In one embodiment, a pressure sensor may be installed in a pipeline of the hydraulic system. The load pressure P of the hydraulic system is detected by the pressure sensor, and the pressure sensor sends a pressure signal to a central control unit.

In one embodiment, the moving speed of a boom may be obtained by a push rod amplitude and a shift of a boom remote controller. The push rod amplitude of the boom remote controller is manually input by an operator. A controller can convert the push rod amplitude into a percentage of amplitude, so as to reflect an instruction input by the operator on the moving speed of the boom, i.e., the magnitude of the push rod amplitude of the respective boom of the boom remote controller corresponds to the moving speed of the boom. The shift is selected through the adjustment shift for operating the moving speed of the boom on the boom remote controller. The shift and the manually input push rod amplitude may together reflect the instruction input by the operator on the moving speed of the boom. The push rod amplitude corresponding to the rotating boom (referenced as "Rotating amplitude" in FIG. 2) is $T_0$, the push rod amplitude corresponding to the first boom section (referenced as "Boom 1 amplitude $T_1$" in FIG. 2) is $T_1$, and the push rod amplitude corresponding to the $n^{-th}$ boom section is $T_n$.

Step S12: The central control unit calculates engine initial control speed which matches the load pressure and the moving speed of the boom according to a power matching model and a flow matching model.

Power Matching Model:

According to an engine characteristic test, the relationship among power, speed, and fuel consumption in a steady state working condition of an engine can be obtained. The optimally efficient work speed at different powers is found through analysis. The functional relationship between power and the optimally efficient work speed is as follows:

$$n1 = f1(Ne) \qquad (1)$$

where n1 is the optimally efficient work speed, and Ne is power.

The relationship among the load pressure, flow, and power may be obtained according to a power transmission relationship:

$$Ne = f2(P, Q) \qquad (2)$$

where Ne is power, P is the load pressure, and Q is the flow.

By combining equations (1) and (2), the relationship among the optimally efficient work speed, the load pressure, and the flow can be obtained:

$$n1 = f3(P, Q) \qquad (3)$$

Flow Matching Model:

According to a boom hydraulic system test, the relationship among different push rod amplitude and a system flow at each boom operation can be obtained:

$$Q0 = g1(T_0) \tag{4}$$

$$Q1 = g2(T_1) \tag{5}$$

$$\ldots$$

$$\ldots$$

$$Qn = g3(T_n) \tag{6}$$

where Q0 is a rotating flow, Q1 is a flow of boom 1, and Qn is a flow of boom n

The total flow demand of the boom structure action is:

$$Q=Q0+Q1+\ldots+Qn \tag{7}$$

The relationship between the total flow demand and the push rod amplitude during a boom action is:

$$Q=f4(T_0,T_1,\ldots,T_n) \tag{8}$$

The relationship among the flow, the hydraulic pump displacement, and the engine speed during a boom action is:

$$n2=f5(Q,q) \tag{9}$$

By combining the power matching model and flow matching model, the relationship between the engine speed n and the load pressure P, the hydraulic pump displacement q, the push rod amplitude corresponding to each boom of the boom remote controller can be obtained:

$$n=f(P,q,T_0,T_1,\ldots,T_n) \tag{10}$$

An engine initial control speed that matches the load pressure and the moving speed of the boom can be calculated through equation (10).

Step S13: The central control unit detects an engine segment speed corresponding to the engine initial control speed, where the engine segment speed is the target speed of the engine.

According to the continuity and stability requirements of a boom action, the flow of hydraulic oil for controlling the boom action needs to be uniform and continuous. The engine initial control speed is a real-time optimal speed and is a quantity that changes in real time. To guarantee the continuity and stability of the boom action, an engine segment speed is set corresponding to the engine initial control speed that changes in real time. The engine segment speed is formed of a plurality of different and continuous speed segments of the speed. Each speed segment has a stable speed value, and the engine segment speed is used as the target speed of the engine, so as to guarantee the continuity of flow and the stability of engine output power during a boom action.

Step S14: The central control unit sends the target speed of the engine to an engine control unit, and the engine control unit performs a speed closed-loop adjustment according to a current speed value fed back by the engine, so that the current speed is consistent with the target speed of the engine.

According to the engine speed control method, a load pressure signal of a hydraulic system and an action speed signal of a boom are acquired. An optimal engine speed that meets a boom power flow demand and an engine output power demand is calculated. The optimal engine speed is set as a target speed of the engine. The target speed of the engine is input to an engine control unit. A current speed fed back by the engine in real time is sent to a central control unit. And the engine control unit implements PID closed-loop control according to the current speed fed back by the engine, so that the current speed of the engine becomes the set target speed of the engine.

Such an engine speed control method can implement energy supply on demand of a power system during a boom action, so that an engine always works at a highly efficient area of fuel utilization, without any excessive energy loss, and impacts, noises, and machine wear of the system are clearly reduced. Further, the engine speed control method can implement flow supply on demand of a hydraulic system during a boom action, and without any overflow loss. In addition, the engine speed control method can implement real-time and automatic adjustment of an engine speed with the changes of the load pressure and boom operation during a boom action, so that the automation degree is high and the adaptability is high.

According to the engine speed control method, a moving speed of a boom is reflected by a push rod amplitude and a shift corresponding to each boom on a boom remote controller. However, the present disclosure is not limited thereto. A moving speed of a boom may be detected in other manners. For example, a displacement sensor is installed on each boom and a moving speed of a boom is detected by the displacement sensor. When each boom moves, a moving speed of the boom and a system flow meet a certain functional relationship, and an engine initial control speed can still be calculated through a power matching model and a flow matching model.

In this exemplary embodiment, an engine segment speed corresponding to the engine initial control speed is set in the central control unit, and the engine segment speed is used as the target speed of the engine. The engine speed control method according to one embodiment of the present disclosure is not limited thereto, and the engine initial control speed can also be directly used as the target speed of the engine, which is introduced in brief in the following embodiment.

Figure 3:
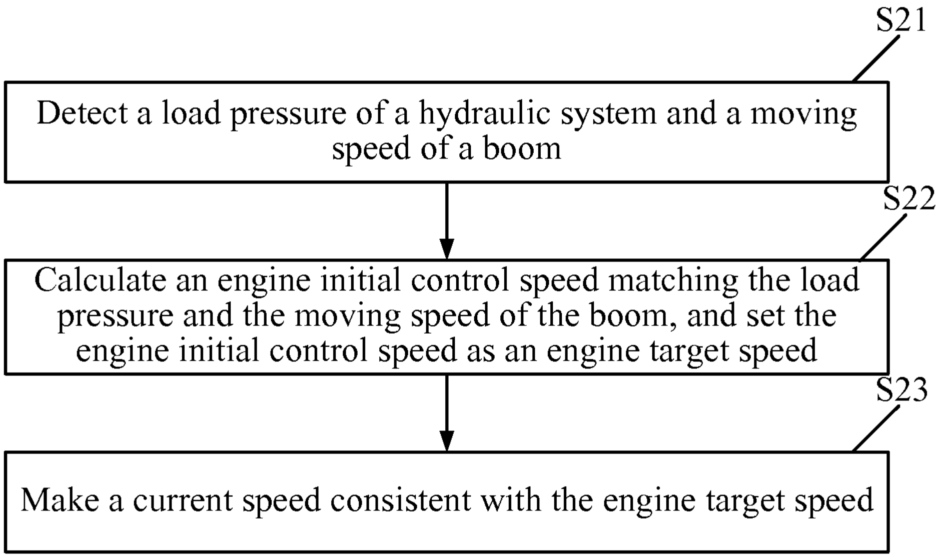
FIG. 3 is a flowchart of a method for controlling engine speed according to another embodiment of the present disclosure.

Referring to FIG. 3, a flowchart of a method for controlling engine speed so as to control an output speed of an engine of a boom-type engineering machine during a boom action is shown according to one embodiment of the present disclosure. As shown in FIG. 3, the engine speed control method provided in the embodiment includes the following steps.

Step S21: A load pressure of a hydraulic system and a moving speed of a boom are detected.

Step S22: A central control unit calculates an engine initial control speed matching the load pressure and the moving speed of the boom according to a power matching model and a flow matching model, where the engine initial control speed is the target speed of the engine.

Step S23: The central control unit sends the target speed of the engine to an engine control unit. The engine control unit performs a speed closed-loop adjustment according to a current speed value fed back by an engine, so that the current speed is consistent with the target speed of the engine.

The rest specific implementations are similar to that of the above embodiment shown in FIGS. 1 and 2, which are no longer described in details herein.

The present disclosure further provides an engine speed control system, which includes a central control unit and an engine control unit. The central control unit acquires a load pressure of a hydraulic system and a moving speed of a boom and determines a target speed of the engine according to the load pressure and the boom speed. The central control unit sends the target speed of the engine to an engine control unit. The engine control unit performs speed closed-loop adjustment according to a current speed value fed back by an engine, so that the current speed is consistent with the target speed of the engine. The engine speed control system adopts the engine speed control method provided in the above embodiments as a control maneuver for controlling an engine output speed of a boom-type engineering machine during a boom action. The control maneuver of the system are illustrated in the above embodiments shown in FIGS. 1-3, which are no longer described in details herein.

In one embodiment, a pressure sensor may be installed on a pipeline of the hydraulic system, the load pressure P of the hydraulic system is detected by the pressure sensor, and the pressure sensor sends a pressure signal to a central control unit. The moving speed of the boom can be reflected by a push rod amplitude and a shift of a boom remote controller.

Such an engine speed control system can implement energy supply on demand of a power system during a boom action, so that an engine always works at a highly efficient area of fuel utilization without any excessive energy loss, and impacts, noises, and machine wear of the system are clearly reduced. Further, the engine speed control system can implement flow supply on demand of a hydraulic system during a boom action, and without any overflow loss. The engine speed control system can also implement real-time and automatic adjustment of an engine speed with the changes of the load pressure and boom operation during a boom action, so that the automation degree is high and the adaptability is high.

The present disclosure further provides a boom-type engineering machine. The boom-type engineering machine is configured with the engine speed control system as disclosed above. As the engine speed control system has the technical effect disclosed above, the boom-type engineering machine with the engine speed control system should also have the corresponding technical effect, which is no longer described in details herein.

In one embodiment, the boom-type engineering machine may be an engineering machinery equipment with an operated boom, such as a concrete pump vehicle, a spreader, an all-terrain crane or a truck crane.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of controlling engine speed, used to control an output speed of an engine of a boom-type engineering machine during a boom action, comprising:

(a) detecting a load pressure of a hydraulic system and a moving speed of a boom;

(b) determining a target speed of the engine according to the load pressure and the moving speed of the boom, by a central control unit;

(c) sending, by the central control unit, the target speed of the engine to an engine control unit; and (d) performing, by the engine control unit, a speed closed-loop adjustment according to a current speed value fed back by the engine, so that a current speed of the engine is consistent with the target speed of the engine, wherein the step of determining the target speed of the engine according to the load pressure and the moving speed of the boom, by the central control unit, comprises:

calculating an engine initial control speed which matches the load pressure and the moving speed of the boom according to a power matching model and a flow matching model; and determining the target speed of the engine according to the engine initial control speed;

wherein the moving speed of the boom is obtained by a push rod amplitude and a shift of a boom remote controller; and wherein the engine initial control speed, the load pressure, and the push rod amplitude meet the relationship of:

$$n=f(P,q,T_0,T_1, \ldots T_n),$$

wherein n is the engine initial control speed;

P is the load pressure;

q is a hydraulic pump displacement;

$T_0$ is the push rod amplitude corresponding to a rotating boom;

$T_1$ is a push rod amplitude corresponding to a first boom section; and $T_n$ is a push rod amplitude corresponding to an $n^{th}$ boom section.

2. The method according to claim 1, wherein the load pressure is detected by a pressure sensor installed in the hydraulic system.

3. A method of controlling engine speed, used to control an output speed of an engine of a boom-type engineering machine during a boom action, comprising:

(a) detecting a load pressure of a hydraulic system and a moving speed of a boom;

(b) determining a target speed of the engine according to the load pressure and the moving speed of the boom, by a central control unit;

(c) sending, by the central control unit, the target speed of the engine to an engine control unit; and (d) performing, by the engine control unit, a speed closed-loop adjustment according to a current speed value fed back by the engine, so that a current speed of the engine is consistent with the target speed of the engine, wherein the step of determining the target speed of the engine according to the load pressure and the moving speed of the boom, by the central control unit, comprises:

calculating an engine initial control speed which matches the load pressure and the moving speed of the boom according to a power matching model and a flow matching model; and determining the target speed of the engine according to the engine initial control speed;

wherein the target speed of the engine is the initial control speed of the engine; or, the central control unit acquires an engine segment speed corresponding to the engine initial control speed, and the target speed of the engine is the engine segment speed;

wherein the moving speed of the boom is obtained by a push rod amplitude and a shift of a boom remote controller; and wherein the engine initial control speed, the load pressure, and the push rod amplitude meet the relationship of:

$$n=f(P,q,T_0,T_1 \ldots T_n),$$

wherein n is the engine initial control speed;

P is the load pressure;

q is a hydraulic pump displacement;

$T_0$ is the push rod amplitude corresponding to a rotating boom;

$T_1$ is a push rod amplitude corresponding to a first boom section; and $T_n$ is a push rod amplitude corresponding to an $n^{th}$ boom section.

4. The method according to claim 3, wherein the load pressure is detected by a pressure sensor installed in the hydraulic system.

5. A system of controlling engine speed, usable in a boom-type engineering machine, comprising:

a central control unit; and an engine control unit, wherein the central control unit is configured to detect a load pressure of a hydraulic system and a moving speed of a boom, to determine a target speed of an engine according to the load pressure and the boom speed, comprising:

calculating an engine initial control speed which matches the load pressure and the moving speed of the boom according to a power matching model and a flow matching model; and determining the target speed of the engine according to the engine initial control speed; and to send the target speed of the engine to the engine control unit; and wherein the engine control unit is configured to perform a speed closed-loop adjustment according to a current speed value fed back by the engine so that a current speed of the engine is consistent with the target speed of the engine;

wherein the moving speed of the boom is obtained by a push rod amplitude and a shift of a boom remote controller; and wherein the engine initial control speed, the load pressure, and the push rod amplitude meet the relationship of:

$$n=f(P,q,T_0,T_1, \ldots T_n),$$

wherein n is the engine initial control speed;

P is the load pressure;

q is a hydraulic pump displacement;

$T_0$ is the push rod amplitude corresponding to a rotating boom;

$T_1$ is a push rod amplitude corresponding to a first boom section; and $T_n$ is a lush rod amplitude corresponding to an $n^{th}$ boom section.

6. The system according to claim 5, further comprising:

a pressure sensor configured to detect the load pressure of the hydraulic system, wherein the pressure sensor is installed in the hydraulic system.

7. The system according to claim 5, wherein the boom-type engineering machine is a concrete pump vehicle, a spreader, an all-terrain crane or a truck crane.

* * * * *